Oct. 21, 1969 J. B. GILSTRAP 3,474,406
AIRCRAFT GLIDE SLOPE INDICATOR
Filed Aug. 19, 1966 3 Sheets-Sheet 1
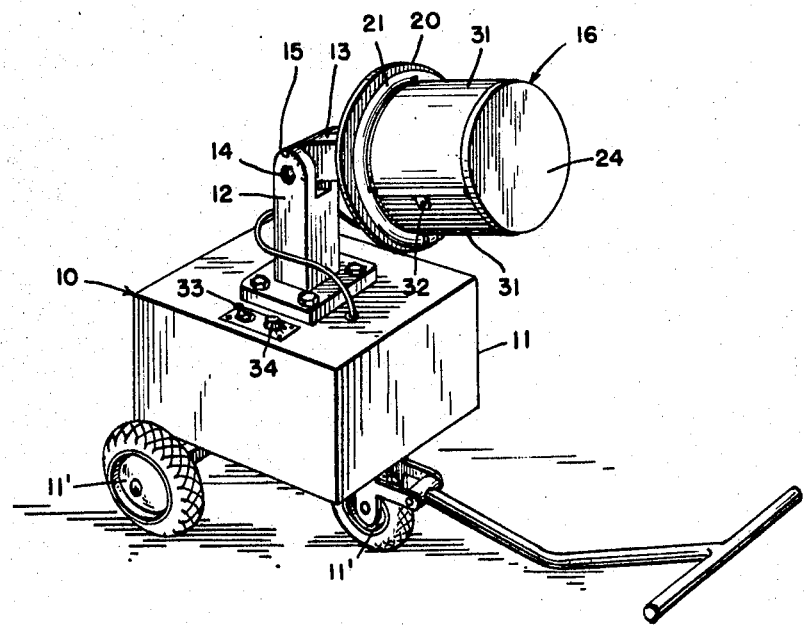
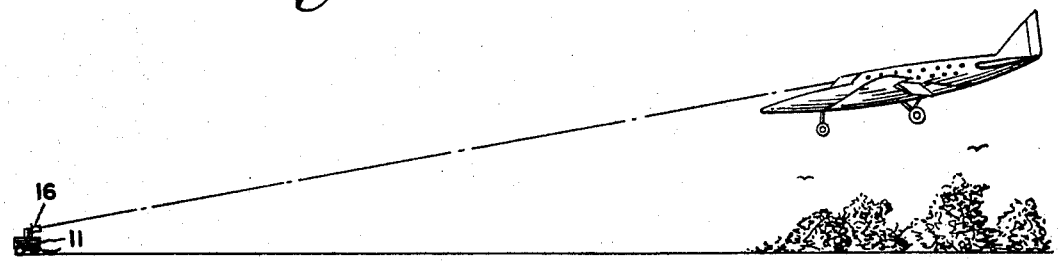
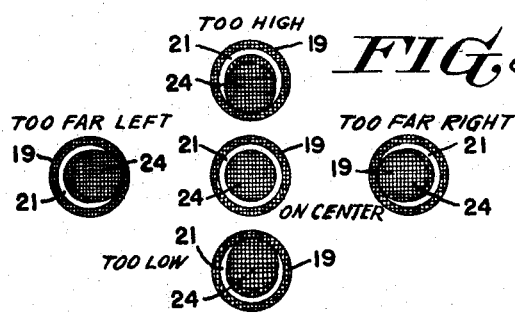
INVENTOR
James B. Gilstrap
BY
ATTORNEY Oct. 21, 1969
J. B. GILSTRAP
3,474,406
AIRCRAFT GLIDE SLOPE INDICATOR
Filed Aug. 19, 1966
3 Sheets-Sheet 2
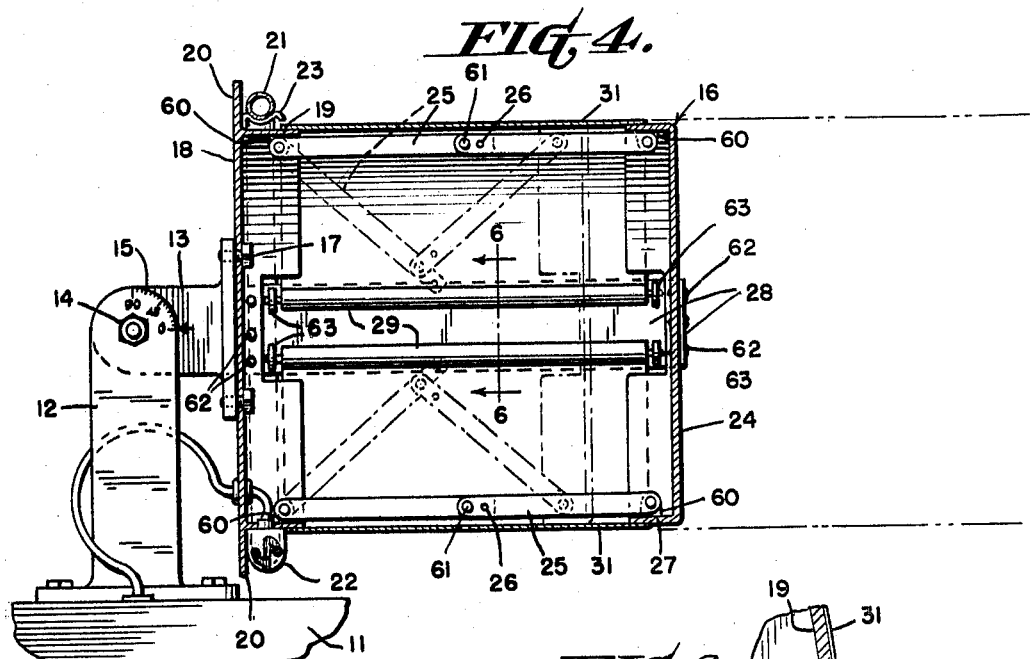
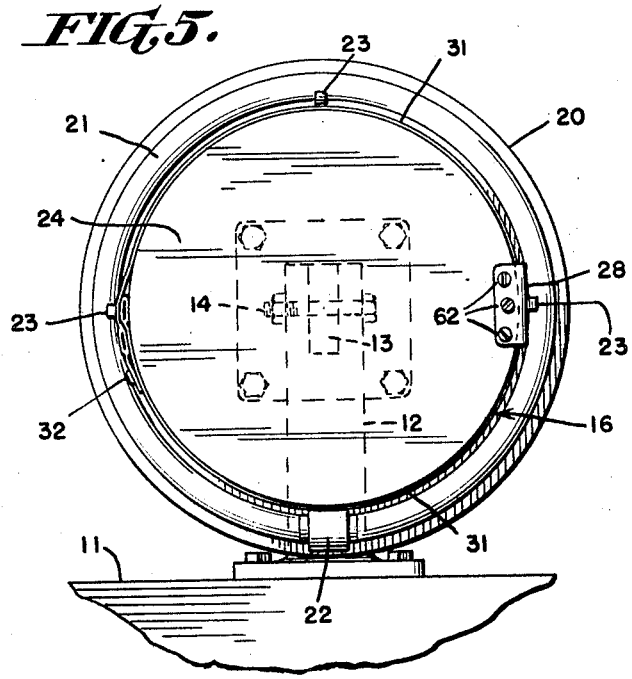
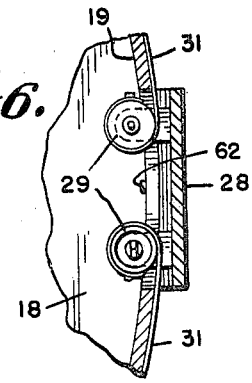
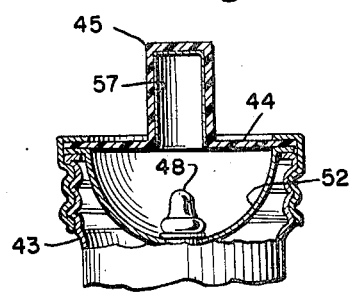
INVENTOR,
James B. Gilstrap
ATTORNEY Oct. 21, 1969 J. B. GILSTRAP 3,474,406
AIRCRAFT GLIDE SLOPE INDICATOR
Filed Aug. 19, 1966 3 Sheets-Sheet 3
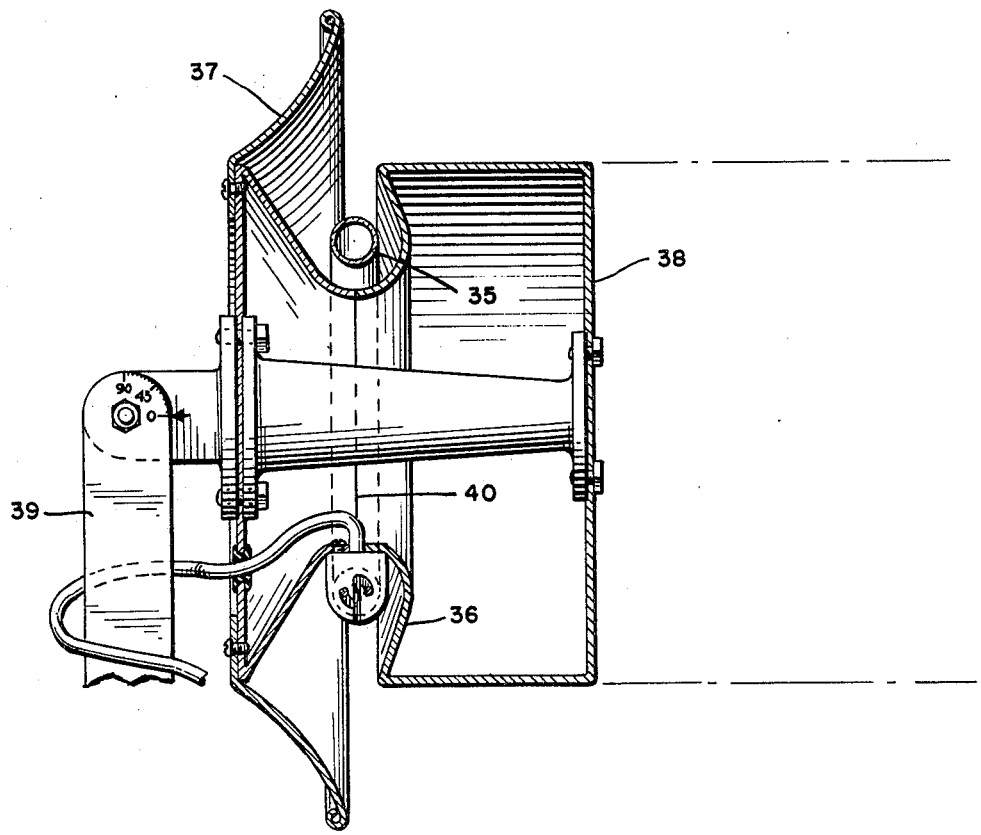
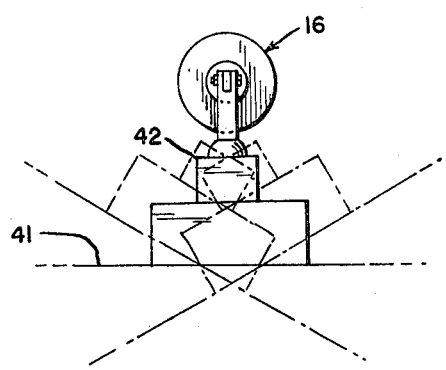
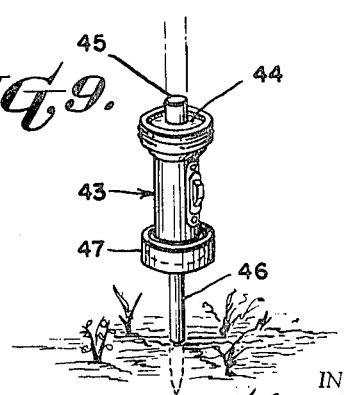
INVENTOR,
James B. Gilstrap United States Patent Office 3,474,406
Patented Oct. 21, 1969

3,474,406
AIRCRAFT GLIDE SLOPE INDICATOR
James B. Gilstrap, 8440 Thames St.,
Springfield, Va. 22151
Filed Aug. 19, 1966, Ser. No. 574,287
Int. Cl. G08g 5/00; G08b 5/00
U.S. Cl. 340—25           6 Claims

ABSTRACT OF THE DISCLOSURE

An aircraft glide slope indicating light having an annular beam of light and means extending outwardly along the axis of the annular light beam for obscuring a portion of the light when the device is viewed from an angle other than along the axis of the light source.

---

The invention described herein may be manufactured and used by or for the Government of the United States of America for governmental purposes without the payment of any royalties thereon or therefor.

The present invention relates to an aircraft landing aid, or more particularly an aircraft glide slope indicator of the optical type. The invention provides an annular or circular light source which is positioned at the down wind end of a landing strip or flight deck and is visible in its entirety to the pilot of a landing aircraft as long as the aircraft remains aligned with the axis normal to the plane of the light source. The light source is angularly adjustable to provide a selected glide angle or azimuth for the aircraft. Thus, an aircraft following the glide path, as shown by the annular light, is on an optimum glide slope and is in alignment with the landing strip of an airfield or with the landing deck of an aircraft carrier. If the aircraft deviates from the glide path or slope, a portion of the annular light source becomes obscured by a blocking device, the obscured or blocked portion of the light source being indicative of the direction of the deviation (laterally and/or vertically) and the direction of the correction necessary to return the aircraft to the glide slope. When the correction is accomplished, the complete circular light source will again be visible to the pilot of the aircraft, thus assuring the pilot that he has aligned the aircraft with the selected glide slope.

In this specification, the term "on center" will be used to describe the position of an aircraft with respect to the light source wherein the annular light source is entirely visible to the pilot, this position indicating that an extension of the axis of the light source passes through the aircraft. The device of the invention may be used with equal facility for guiding to landing either fixed or rotary winged aircraft by merely adjusting the beam to a suitable glide slope azimuth and angle.

In the use of the guidance device of the present invention, the aircraft pilot is guided by the annular light until within a very short distance of the usual landing lights of the airport whereupon the pilot is guided by the usual landing lights. The foregoing procedure avoids overrunning the landing strip or colliding with the guiding device, as the annular light is positioned at the downwind end of the landing strip.

The glide slope indicating device may be mounted on a wheeled cart or the like for easy portability on airfields and on the flight decks of vessels. Other more compact forms of the device may be included in survival kits to ensure to a great extent the rescue by helicopters of survivors of jungle warfare, or the like.

An object of the invention is to provide a device wherein an aircraft is optically guided along a glide slope to land safely on an airfield runway or on the landing deck of a ship.

Another object is to provide a glide slope indicator to assist a pilot in guiding an aircraft of either the fixed-wing or rotary wing aircraft in an accurate manner thus to avoid, to a great extent, deviations of the aircraft, in either vertical or horizontal directions, for a selected glide path.

A further object is to provide a glide slope indicator for use by a pilot in landing an aircraft, wherein the pilot is provided with visual information for returning the aircraft to an "on center" position with respect to the indicator after having deviated from the landing path.

A still further object is to provide a glide slope indicator for landing an aircraft wherein the direction and extent of deviations in glide path of the aircraft in vertical and horizontal directions are made apparent to the pilot and are readily correctable.

Still another object is to provide a glide slope indicator which is portable and readily adapted to various conditions of use on land or aboard ship.

Other objects, advantages and novel features of the invention will become apparent from the following detailed description of the invention when considered in conjunction with the accompanying drawings wheren:

FIG. 1 is a perspective view of the device of the present invention mounted on a wheeled vehicle to enhance the portability thereof;

FIG. 2 is a view showing the device guiding an aircraft to a landing field;

FIG. 3 is a diagrammatic view showing the appearance of the device when viewed from the landing aircraft at various deviations from the glide slope, both vertical and horizontal, and directly on center;

FIG. 4 shows a vertical sectional view of the device;

FIG. 5 is a front elevation of the device;

FIG. 6 is a sectional view taken along the line 6—6 of FIG. 4;

FIG. 7 is a vertical section similar to FIG. 4 and showing an alternate form of the device;

FIG. 8 shows a rear elevation in somewhat diagrammatic form of a further variation of the device wherein a gyro-stabilizer is mounted between the device and the supporting structure resting on the deck of a ship;

FIG. 9 shows a further slightly modified form of the device adapted for use in a hand flashlight; and FIG. 10 is a fragmentary vertical sectional view of the device of FIG. 9.

Referring more particularly to the drawings, wherein like numerals indicate like parts throughout the several views, 10 indicates generally the portable glide path guiding device of the present invention. The device 10 comprises a body or cart 11 which may contain batteries or other source of power and accessories to be used in the operation of the glide path device. The body or cart 11 may be provided with wheels 11' to facilitate moving the apparatus onto and off the heliport or landing strip. Mounted on the top of body 11 is a vertical support 12. An angularly adjustable arm 13 is pivoted to the support 12 by means of a bolt 14 which also holds the arm 13 in angularly adjusted position. A scale 15 marked, for example, in degrees of angle may be used to assist in aligning the device with a desired angle of glide path for a particular aircraft.

A beam forming apparatus, indicated generally at 16, is fastened as at 17 to the support 13, the fastening means passing through the circular end plate 18 of the beam forming device 16. A flange 19 is fastened to plate 18, in any desired manner, such as by welding, and is spaced from the periphery of the plate 18 to form a shield 20 for a source of light in the form of an annular light source 21, such as a circular fluorescent tube, although any arrangement of lights in the form of a circle may be used. In certain applications the tube 21 is supported by a double socket 22 and spring clips 23. A somewhat similar circular end plate 24 is held in spaced relation with respect to plate 18 by two folding linkages 25 capable of being locked in extended position. Plate 24 is provided with a flange 27 of the same diameter as flange 19. Plate 24 does not extend beyond the flange 27 thus providing a clear path for the passage of light from light source 21.

The linkages 25 are mounted substantially diametrically opposite each other and are pivotally connected at their outer ends to ears 60 on flanges 19 and 27 of plates 18 and 24, respectively. The folding linkages 25 comprise members pivoted together at their adjacent ends intermediate the plates 18 and 24, as at 61. The arms are held in extended position by a locking device 26 which may comprise any well-known type such as a pin or bolt extending through both of the arms of each pair 25 or a snap type concavo-convex stamping in each arm and adapted to interfit in locking engagement in the extended position of the arms 25, as shown in FIG. 4.

A bracing and curtain roller supporting plate 28 is secured by bolts or screws 62 to the plates 18 and 24 and assists in maintaining the plates 18 and 24 in rigid alignment in the extended position. The bracket 28 is provided with shade roller supports 63 on which the window-shade type rollers 29 are mounted.

The rollers 29 are each equipped with lightproof shades 31 which, when unrolled, wrap around the flanges, thus enclosing the space between end plates 18 and 24. The ends of the shades 31 are held together by a fastening device such as the snap fastener 32. As shown by dot and dash lines in FIG. 4, when the shades 31 are rolled up and the bracket 28 is removed, the end plate 24 may be moved back to engage end plate 18 as the arms 25 are collapsed.

An on-off switch 33 may be provided for the light circuit and a rheostat type device 34 may be provided for controlling the brilliance of the light in accordance with impairment of visibility by fog or the like. Any suitable fluorescent tube circuit may be employed.

A slight modification of the lighting and reflecting structure is shown in FIG. 7. The supporting structure is the same as in the preferred form while the circular fluorescent tube 35 is fitted with an annular reflector 36 which directs the light rays toward a second reflector 37 which, in turn, directs an annular pattern of the rays toward the aircraft. A cylindrical obscuring or blocking device 38 is extended forward of the reflectors 36 and 37 to block a portion of the annular pattern of light unless the aircraft is directly "on center" with relation to the guiding device. The reflector 36 may be separable as at 40 to facilitate replacement of light tube 35.

FIG. 8 shows the guiding device 16 modified slightly for use on the flight deck 41 of a ship of the aircraft carrier type. A suitable gyro-stabilizer shown in a conventional form at 42 supports the guiding device 16 of the present invention to compensate for the usual motion of a ship at sea, thus ensuring a greater stability for the device during periods when it is being used for guiding an aircraft to the flight deck 41 of a ship.

FIG. 9 shows a further modification of the device of the present invention incorporated in a flashlight 43 which may be included in a survival kit. The clear plastic lens 44 of flashlight 43 has secured thereto or formed integrally therewith (as shown) a cylindrical blocking or obscuring projection 45 similar to those in the other forms of the invention. In this form of the invention is employed a substantially point source of light in the form of a light bulb 48 having the usual flashlight reflector 52. This form of the invention is particularly advantageous for guiding a helicopter or the like to an area where rescue operations are necessary and where the recognition distances are not too great. The flashlight 43 may be mounted on a metal stake 46 having a socket 47 for receiving the base of the flashlight. The purpose of the socketed stake is to provide the steadiness desired during the guiding operation. In order to prevent the passage of light through the blocking projection, an opaque coating 57 may be applied to the interior of 45. Any other well-known means may be employed for providing an opaque light-blocking projection in the center of the lens.

The point source of light similar to that shown in FIG. 10 may also be employed in place of the annular light source in the larger forms of the device with minor modification of the reflectors.

Referring particularly to FIG. 3 wherein is shown a plurality of diagrams indicating the appearance of the device of the present invention from different angles with respect thereto. In the center is shown the "ON BEAM" view as seen by the pilot of the aircraft when the aircraft is directly aligned with an extension of the axis of the device 16 and wherein the circle of light is continuous or unbroken. To the right of the "ON CENTER" portion is a second portion of the diagram showing the circle of light as discontinuous, the left side of the circle being cut off from the pilot's view by reason of the blocking means extending through the center of the beam forming device; the aircraft thus being "TOO FAR RIGHT." When the aircraft is "TOO FAR LEFT," the blocking means shuts out the right side of the circle of light from the view of the pilot, as shown to the left of "ON CENTER" portion. When the aircraft is "TOO HIGH" the circle of light is cut off at the lower portion thereof as shown above the "ON CENTER" portion and indicated as "TOO HIGH." When the aircraft is flying "TOO LOW," the circle of light will be cut off at the upper portion as shown in the "TOO LOW" portion of the diagram below the "ON CENTER" portion. While only the vertical and horizontal deviations have been shown, it is understood that the various combinations of both horizontal and vertical deviations will be shown by the blocked portion of the circle of light being positioned at angles between the vertical and horizontal positions shown.

It is also understood, in the operation of the device that light from the source will be visible to an aircraft approaching the glide path and will provide information to the pilot preparing to enter the glide path.

In this description of the invention a source of white light has been assumed. It may be desirable to use an arrangement of colored light to provide additional information. For example, the annular source may be divided into quadrants—each of which is of a different color to provide up, down and right, left information.

What is claimed is:

1. A glide slope indicator for guiding an aircraft to a landing comprising:
    (a) an annular light source for forming an annular beam of light, and
    (b) means for obscuring a portion of said annular beam of light from the pilot of said aircraft when said aircraft deviates from an on-center approach toward said light.

2. A glide slope indicator for guiding an aircraft to a landing comprising:
    (a) means for forming an annular beam of light, and
    (b) means extending along the axis of said annular beam of light for obscuring a portion of said annular beam from the pilot of said aircraft when said aircraft deviates from an on-center approach toward said light.

3. The glide slope indicator of claim 2 wherein said obscuring means is cylindrical.

4. The glide slope indicator of claim 2 wherein said obscuring means is an extensible cylinder.

5. A glide slope indicator for guiding an aircraft to a landing comprising:
(a) an annular light source for said indicator providing an annular beam,
(b) obscuring means extending along the axis of said light source a sufficient distance beyond said light source to obscure a portion thereof indicative of the direction and amount of deviation of the aircraft from an on-center approach,
(c) a vehicle for said indicator, and
(d) means adjustably securing said indicator to said vehicle wherein the indicator is adjustably held at an angle coinciding with a selected glide path for said aircraft.

6. A glide slope indicator for guiding an aircraft to a landing comprising:
(a) an annular light source for said indicator,
(b) means for shielding said light source from view from the rear,
(c) obscuring means extending forward and along the axis of said light source whereby visual reference to a portion of said light source is blocked when the aircraft deviates from an on-center approach toward the light source,
(d) portable means for transporting and supporting said light source, and
(e) means interposed between said light source and said portable means for adjusting the light source to a plurality of selected angular positions in accordance with a desired angle of approach for the aircraft.

References Cited
UNITED STATES PATENTS

| | | | |
|---|---|---|---|
| 2,184,004 | 12/1939 | Pennow | 240—1.2 |
| 2,329,557 | 9/1943 | Rolph | 240—1.2 |

ALVIN H. WARING, Primary Examiner

U.S. Cl. X.R.

116—124; 240—1.2; 340—366